(12) United States Patent
Yamada

(10) Patent No.: US 7,540,556 B2
(45) Date of Patent: Jun. 2, 2009

(54) VEHICLE BODY FRAME

(75) Inventor: Takayuki Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/015,011

(22) Filed: Jan. 16, 2008

(65) Prior Publication Data

US 2008/0174150 A1 Jul. 24, 2008

(30) Foreign Application Priority Data

Jan. 18, 2007 (JP) ............................. 2007-009581

(51) Int. Cl.
*B62D 25/08* (2006.01)
(52) U.S. Cl. .............................. 296/187.09; 296/203.02
(58) Field of Classification Search ............ 296/187.09, 296/187.08, 203.01, 204, 203.02, 203.03, 296/203.04; 188/377; 280/784, 781; 293/132, 293/133
See application file for complete search history.

(56) References Cited

U.S. PATENT DOCUMENTS 5,941,597 A * 8/1999 Horiuchi et al. ........ 296/203.01
6,055,788 A * 5/2000 Martin et al. ............... 296/204

FOREIGN PATENT DOCUMENTS

| JP | 11-208519 | 8/1999 |
|---|---|---|
| JP | 2003-072587 | 3/2003 |

* cited by examiner

*Primary Examiner*—Joseph D Pape
(74) *Attorney, Agent, or Firm*—Rankin, Hill & Clark LLP

(57) ABSTRACT

Vehicle body frame includes a main frame section that is made of light metal and extends in a band shape from a front end portion to a rear end portion of the vehicle body frame to thereby form a compression wall portion, and a sub-frame section that is made of steel and fixedly mounted along the band-shaped main frame section. The sub-frame section forms a hollow structure in conjunction with the main frame section and forms a tension wall portion. The main frame section has a greater thickness than the sub-frame section.

7 Claims, 11 Drawing Sheets

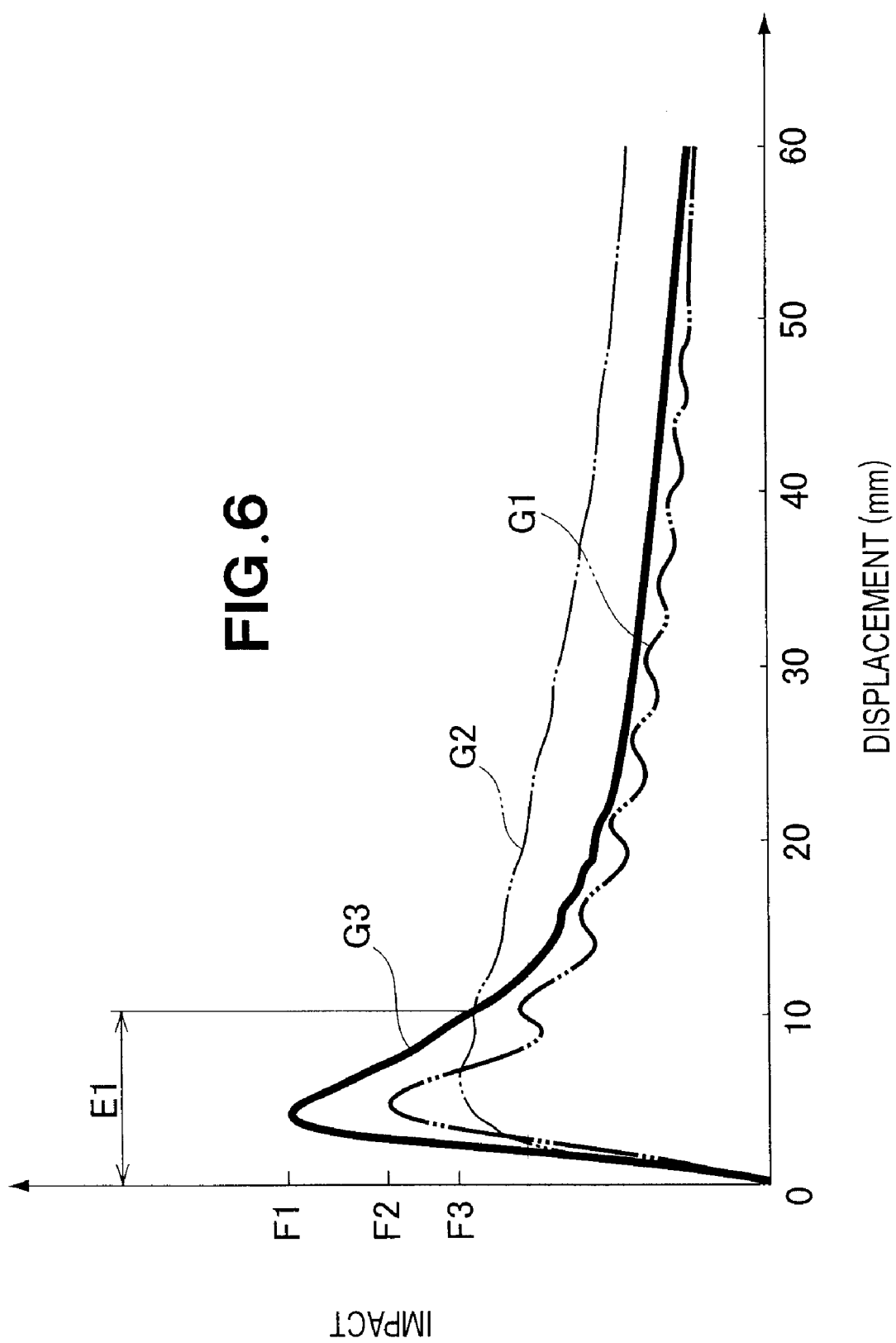

VEHICLE BODY FRAME

FIELD OF THE INVENTION

The present invention relates to vehicle body frames which include parts where are produced a compressive stress and tensile stress when an impact acts on the vehicle body frame.

BACKGROUND OF THE INVENTION

Among the known front vehicle body structures are ones having left and right front side members (hereinafter referred to as "vehicle body frames") made of a light alloy material, such as aluminum alloy, as disclosed, for example, in Japanese Patent Application Laid-Open Publication Nos. HEI-11-208519 (JP-A-11-208519) and 2003-72587 (JP-A-2003-72587).

Each of the vehicle body frames disclosed in JP-A-11-208519 and JP-A-2003-72587 is a hollow, tubular structure which has an outer wall formed into a regular polygonal shape (e.g., regular hexagonal shape) and a plurality of radial ribs connecting between the individual apexes and the central axis of the outer wall. With each of these disclosed vehicle body frames, which is made of a light alloy material, such as aluminum alloy, it is possible to properly stand or bear a compressive stress produced when an impact has occurred in the axial direction of the vehicle body frame. The left and right vehicle body frames are component parts that define engine room frames. The engine is disposed between the left and right vehicle body frames, and left and right front wheels are disposed outwardly of the left and right vehicle body frames.

Some of the known vehicle body frames have bent portions formed in correspondence with a layout of the engine (transversely-mounted engine) and front road wheel. With such a vehicle body frame having bent portions, however, it is difficult to secure a sufficient energy absorption amount when an impact has been applied to a front portion of the vehicle body frame. Thus, it has been conventional to achieve a sufficient energy absorption amount, such as by increasing the thickness of the vehicle body frame.

Therefore, there has been a great need to put into practical use a technique which allows a sufficient energy absorption amount to be secured without increasing the thickness and hence the weight of a vehicle body frame having a bent portion.

SUMMARY OF THE INVENTION

In view of the foregoing prior art problems, it is an object of the present invention to provide a vehicle body frame of a type having a bent portion which can achieve a sufficient energy absorption amount of the frame.

In order to accomplish the above-mentioned object, the present invention provides an improved vehicle body frame formed as a hollow structure of a generally rectangular sectional shape and including a compression wall portion and tension wall portion where are produced a compressive stress and tensile stress, respectively, when an axial impact acts on the vehicle body frame, which comprises: a main frame section made of light alloy and extending from a front end portion to a rear end portion of the vehicle body frame to thereby form the compression wall portion; and a sub-frame section made of steel and fixedly mounted along the main frame section, the sub-frame section forming the hollow structure in conjunction with the main frame section and forming the tension wall portion, the main frame section having a thickness greater than a thickness of the sub-frame section.

The light alloy material is smaller in specific gravity than the steel material. More specifically, the specific gravity of aluminum alloy preferably used as the light alloy material in the present invention is about one-third of that of the steel material. Thus, for a same weight, the thickness of the main frame section made of aluminum alloy can be increased up to about three times the thickness of the sub-frame section made of steel.

According to the present invention, the main frame section is made of the light alloy material, such as aluminum alloy, and thus, it can have an increased thickness and hence an increased resistive strength against a buckling stress. The steel material, on the other hand, has a greater resistive strength against a tensile stress and a greater maximum elongation amount than the light alloy material. Thus, in the present invention, the compression wall portion is formed by the main frame section made of light alloy, while the tension wall portion is formed by the sub-frame section made of steel.

Because the compression wall portion is formed by the main frame section made of light alloy, it can be formed into a greater thickness than the sub-frame section, and such a great thickness can achieve an increased resistive strength of the compression wall portion against a buckling stress. Further, because the tension wall portion is formed by the sub-frame section made of steel that has a greater resistive strength against a tensile stress and a greater maximum elongation amount than the light alloy material, it can achieve an increased energy absorption amount.

Thus, when an impact has acted on the inventive vehicle body frame in the axial direction of the frame, a compressive stress produced in the compression wall portion can be appropriately withstood or borne by the compression wall portion, and a tensile stress produced in the tension wall portion can be appropriately withstood or borne by the tension wall portion.

Thus, with the simple construction of merely attaching the sub-frame section made of steel to the main frame section made of light metal, it is possible to readily achieve a sufficient energy absorption amount of the vehicle body frame having a bent portion. In addition, because the present invention can readily secure a sufficient rigidity of the vehicle body frame having the bent portion, it is possible to secure a space for accommodating an engine, front road wheel, etc. As a result, it is possible to enhance a degree of layout freedom of the engine, front road wheel, etc.

The following will describe various embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 6 is a graph explanatory of an impact that can be borne by the vehicle body frame according to the first embodiment;

DETAILED DESCRIPTION OF THE PREFERRED EMBODIMENTS

Figure 1:
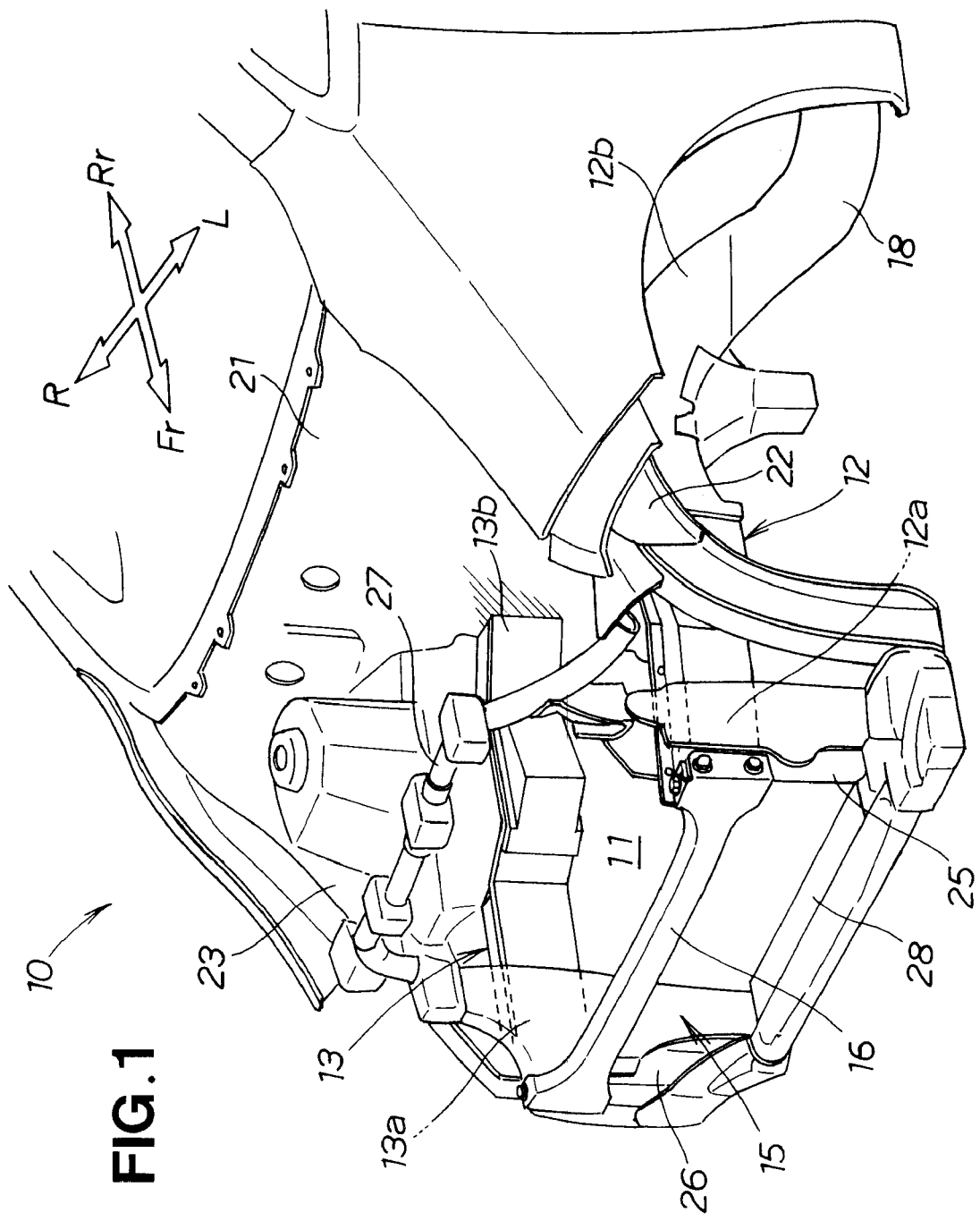
FIG. 1 is a perspective view showing a front vehicle body structure provided with vehicle body frames according to a first embodiment of the preset invention.

In the following description, the terms "front", "rear", "left" and "right" are used to refer to directions as viewed by a human operator or driver of an automotive vehicle, and these directions are indicated in the drawings by reference characters Fr, Rr, L and R, respectively.

First Embodiment

FIG. 1 is a perspective view showing a front vehicle body structure 10 provided with vehicle body frames according to a first embodiment of the preset invention. The front vehicle body structure 10 includes: left and right front side members (hereinafter referred to as "left and right vehicle body frames") 12 and 13 that define left and right frames of an engine room 11; a bulkhead 15 provided on left and right front end portions 12a and 13a of the left and right vehicle body frames 12 and 13; a connection bar 16 connecting between the front end portions 12a and 13a of the vehicle body frames 12 and 13; left and right outriggers 18 (the right outrigger is not shown); and a lower dashboard section 21 provided on the left and right outriggers 18 and rear end portions 12b and 13b of the left and right vehicle body frames 12 and 13.

Engine/transmission unit 19 (FIG. 3) is disposed transversely in the engine room 11. The engine/transmission unit 19 is a unit where a transmission is integrally mounted to an engine.

The front vehicle body structure 10 also includes a left upper member 22 provided outwardly of the left vehicle body frame 12, and a right upper member 23 provided outwardly of the right vehicle body frame 13.

The bulkhead 15 includes: a left support post 25 provided on the left front end portion 12a of the left vehicle body frame 12; a right support post 26 provided on the right front end portion 13a of the right vehicle body frame 13; an upper beam 27 connecting between upper end portions of the left and right support posts 25 and 26; and a lower beam 28 connecting between lower end portions of the left and right support posts 25 and 26. Radiator 29 (FIG. 3) is fixed to the bulkhead 15.

Because the left and right vehicle body frames 12 and 13 are constructed and arranged in horizontal symmetry with each other, the following paragraphs describe the left vehicle body frame 12 as the inventive vehicle body frame, with a detailed description about the right vehicle body frame 13 omitted.

Figure 2:
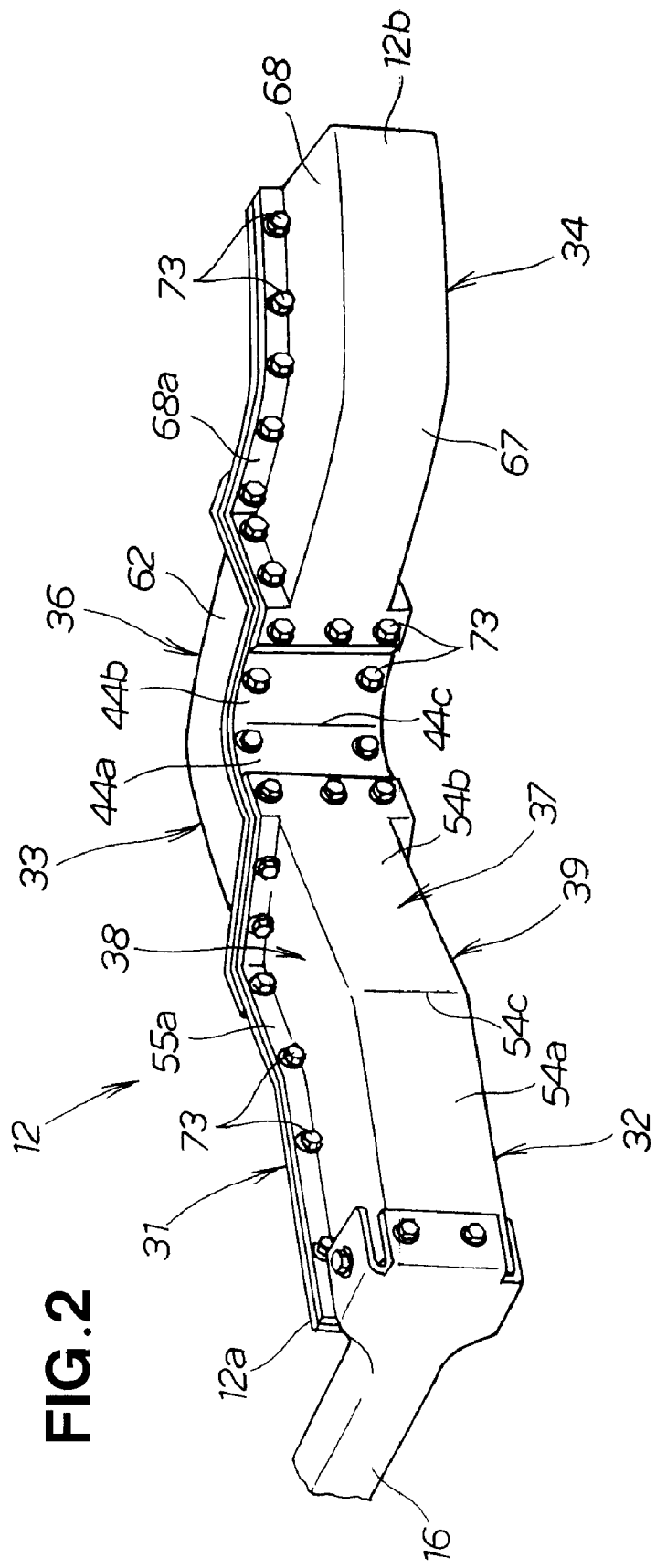
FIG. 2 is a perspective view of one of the vehicle body frames according to the first embodiment of the present invention.

FIG. 2 is a perspective view of one of the vehicle body frames (i.e., left vehicle body frame 12) according to the first embodiment of the present invention. The vehicle body frame 12 includes: a main frame section 31 made of light metal; a front sub-frame section 32 made of steel and fixedly mounted to a front portion of the main frame section 31; a middle sub-frame section 33 made of steel and fixedly mounted to a middle portion of the main frame section 31; and a rear sub-frame section 34 made of steel and fixedly mounted to a rear portion of the main frame section 31. The vehicle body frame 12 is formed into a hollow structure of a generally rectangular sectional shape with four or more wall portions that include inner and outer walls 36 and 37 and upper and lower walls 38 and 39.

Figure 3:
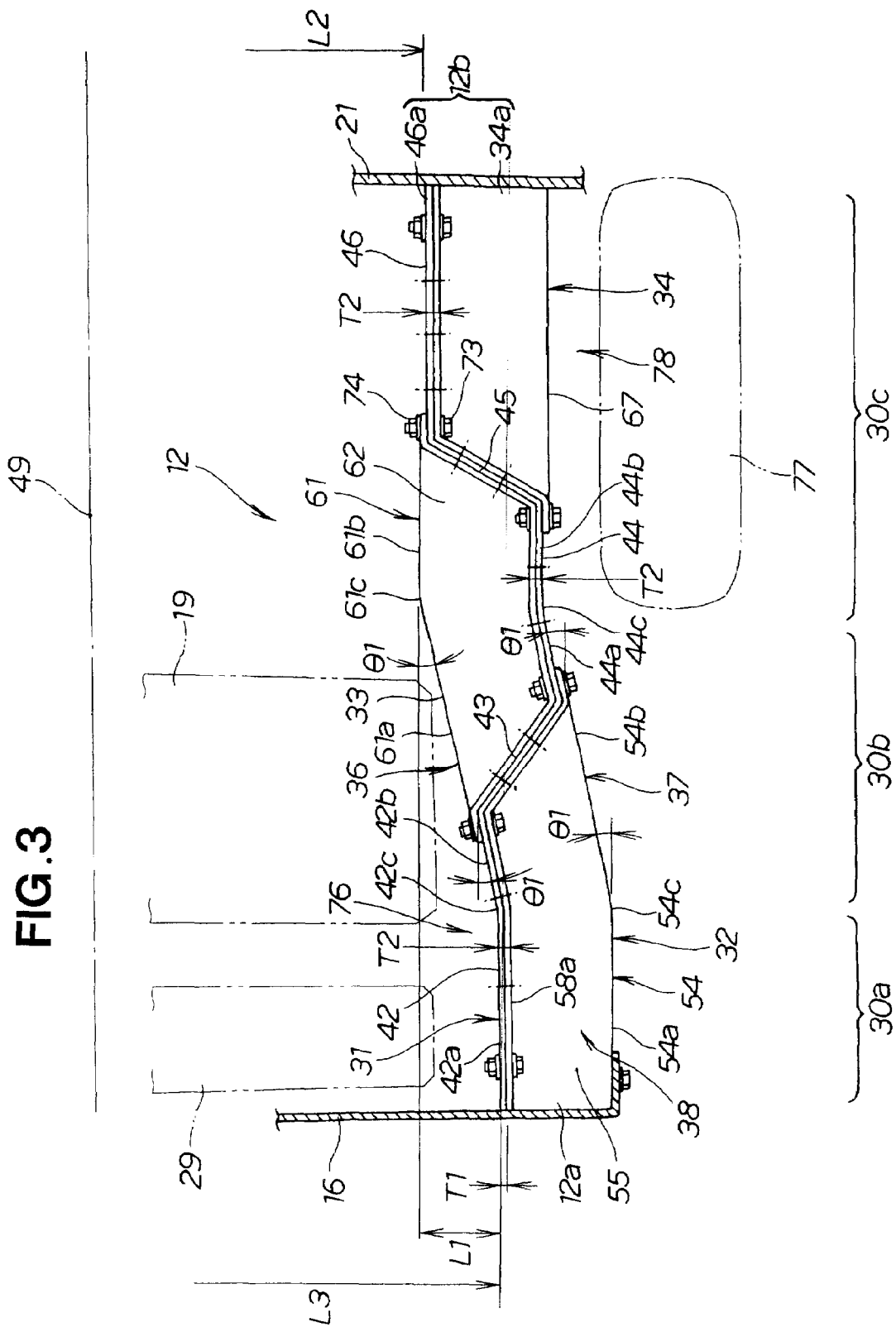
FIG. 3 is a plan view of the vehicle body frame according to the first embodiment of the present invention.
Figure 4:
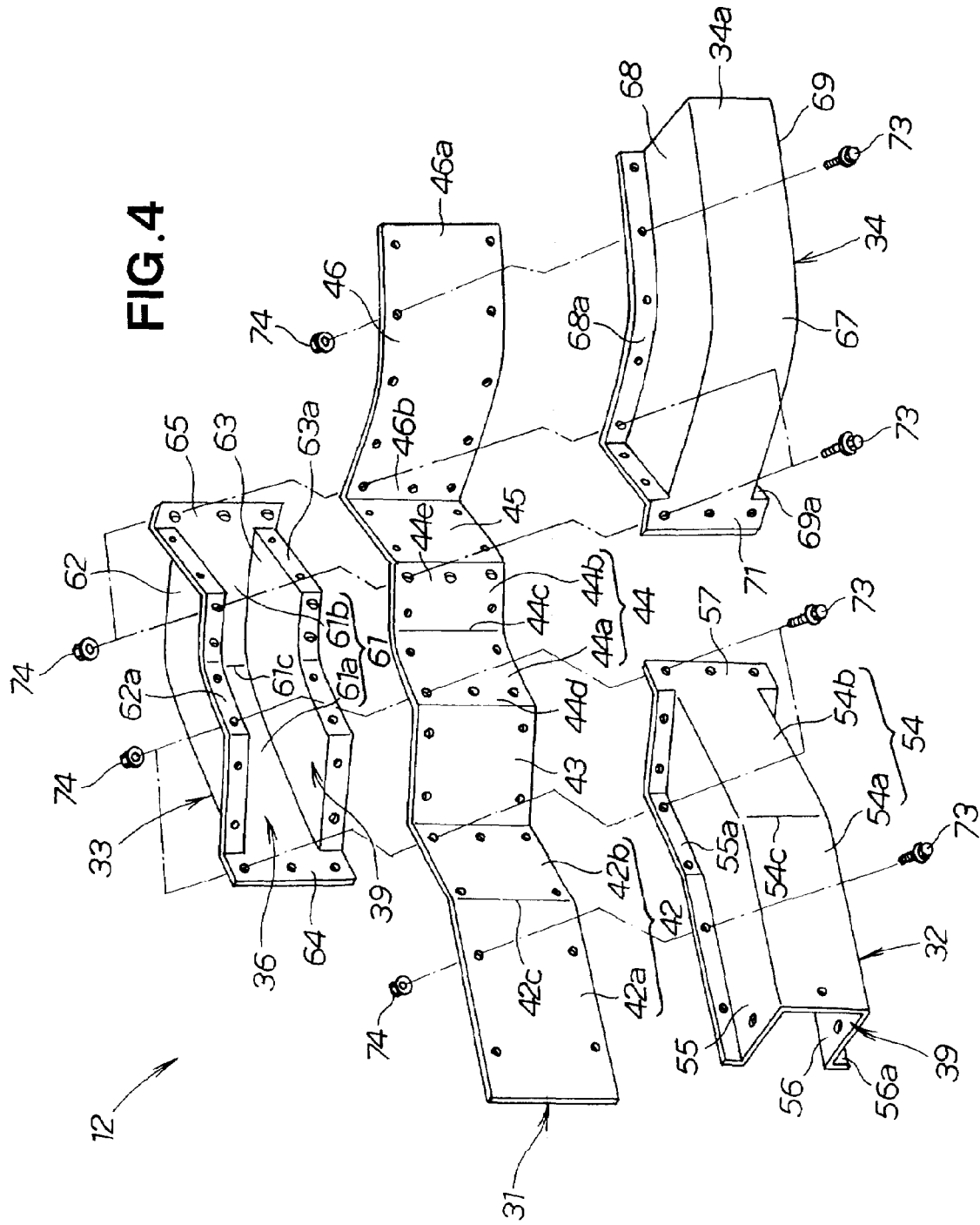
FIG. 4 is an exploded perspective view of the vehicle body frame according to the first embodiment.

FIG. 3 is a plan view of the vehicle body frame according to the first embodiment of the present invention, and FIG. 4 is an exploded perspective view of the vehicle body frame according to the first embodiment.

The main frame section 31 is in the shape of a band of a uniform thickness T1 extending from the front end portion 12a up to the rear end portion 12b of the vehicle body frame 12. The main frame section 31 sequentially includes, in a front-to-rear direction of the vehicle body frame, a front compressed wall portion 42, front cross portion 43, middle compressed wall portion 44, rear cross portion 45 and rear compressed wall portion 46. As an example, the main frame section 31 is formed by casting.

The front compressed wall portion 42 constitutes a front portion of the inner wall 36 of the vehicle body frame 12. The front compressed wall portion 42 has its front half portion 42a disposed in parallel to a centerline 49 of the vehicle body and its rear half portion 42b bent at 42c (i.e., front bent portion 42c) to slant inwardly toward the centerline 49 with an angle θ1 (see FIG. 3). The front compressed wall portion 42 has a plurality of upper mounting holes formed in its upper edge portion and a plurality of lower mounting holes formed in its lower edge portion.

The front cross portion 43 extends from the inner wall 36 to the outer wall 37. The front cross portion 43 has a plurality of upper mounting holes formed in its upper edge portion and a plurality of lower mounting holes formed in its lower edge portion.

The middle compressed wall portion 44 constitutes a middle portion of the outer wall 37 of the vehicle body frame 12. The middle compressed wall portion 44 has its front half portion 44a bent to slant inwardly toward the centerline 49 with the angle θ1 and its rear half portion 44b bent at 44c (i.e., middle bent portion 44c) to extend in parallel to the centerline 49. The middle compressed wall portion 44 has a plurality of upper mounting holes formed in its upper edge portion and a plurality of lower mounting holes formed in its lower edge portion.

The rear cross portion 45 extends from the outer wall 37 to the inner wall 36. The rear cross portion 45 has a plurality of upper mounting holes formed in its upper edge portion and a plurality of lower mounting holes formed in its lower edge portion.

The rear compressed wall portion 46 constitutes a rear portion of the inner wall 36 of the vehicle body frame 12. The rear compressed wall portion 46 extends in parallel to the centerline 49 and has a rear end portion 46a fixedly mounted to the lower dashboard section 21. The rear compressed wall portion 46 has a plurality of upper mounting holes formed in its upper edge portion and a plurality of lower mounting holes formed in its lower edge portion.

The front sub-frame section 32 is a member of a generally "U" (or channel) sectional shape which is fixedly mounted along a front region (front compressed wall portion 42, front cross portion 43, etc.) of the main frame section 31 and which constitutes a hollow structure in conjunction with the front region of the main frame section 31. The front sub-frame section 32 has a thickness T2.

More specifically, the front sub-frame section 32 includes: a tension wall portion 54; upper wall portion 55; lower wall portion 56; rear flange 57; upper flange 55a; and lower flange 56a. The tension wall portion 54, upper wall portion 55 and lower wall portion 56 together constitute a member of a generally "U" (or channel) sectional shape.

The tension wall portion 54 of the front sub-frame section 32 constitutes a front portion of the outer wall 37 of the vehicle body frame 12. The tension wall portion 54 has its front half portion 54a disposed in parallel to the centerline 49 of the vehicle body and its rear half portion 54b bent at 54c (i.e., front bent portion 54c) to slant inwardly toward the centerline 49 with the angle θ1. The rear flange 57 is formed at the rear end of the tension wall portion 54 and has a plurality of outer mounting holes formed therein.

The upper wall portion 55 of the front sub-frame section 32 constitutes a front portion of the upper wall 38 of the vehicle body frame 12. The upper flange 55a is formed at the inner upper edge of the upper wall portion 55 and has a plurality of upper mounting holes formed therein.

The lower wall portion 56 of the front sub-frame section 32 constitutes a front portion of the lower wall 39 of the vehicle body frame 12. The lower flange 56a is formed at the inner lower edge of the lower wall portion 56 and has a plurality of lower mounting holes formed therein.

The middle sub-frame section 33 is a member of a generally "U" (or channel) sectional shape which is fixedly mounted along a middle region (front cross portion 43, middle compressed wall portion 44, rear cross portion 45, etc.) of the main frame section 31 and which constitutes a hollow structure in conjunction with the middle region of the main frame section 31. The middle sub-frame section 33 has the thickness T2.

More specifically, the middle sub-frame section 33 includes: a tension wall portion 61; upper wall portion 62; lower wall portion 63; front flange 64; rear flange 65; upper flange 62a; and lower flange 63a. The tension wall portion 61, upper wall portion 62 and lower wall portion 63 of the middle sub-frame section 33 together constitute a member of a generally "U" (or channel) sectional shape.

The tension wall portion 61 of the middle sub-frame section 33 constitutes a middle portion of the inner wall 36 of the vehicle body frame 12. The tension wall portion 61 has its front half portion 61a slanting inwardly toward the centerline 49 with the angle θ1 and its rear half portion 61a bent at 61c (i.e., middle bent portion 61c) to extend in parallel to the centerline 49 of the vehicle body.

The front flange 64 is formed at the front end of the tension wall portion 61 of the middle sub-frame section 33, and the rear flange 65 is formed at the rear end of the middle tension wall portion 61. Front mounting holes are formed in the front flange 64, and rear mounting holes are formed in the rear flange 65.

The upper wall portion 62 of the middle sub-frame section 33 constitutes a middle portion of the upper wall 38 of the vehicle body frame 12. The upper flange 62a is formed at the outer upper edge of the upper wall portion 62 and has a plurality of upper mounting holes formed therein.

The lower wall portion 63 of the middle sub-frame section 33 constitutes a middle portion of the lower wall 39 of the vehicle body frame 12. The lower flange 63a is formed at the outer lower edge of the lower wall portion 63 and has a plurality of lower mounting holes formed therein.

The rear sub-frame section 34 is a member of a generally "U" (or channel) sectional shape which is fixedly mounted along a rear region (rear cross portion 45, rear compressed wall portion 46, etc.) of the main frame section 31 and which constitutes a hollow structure in conjunction with the rear region of the main frame section 31. The rear sub-frame section 34 has the thickness T2. The rear sub-frame section 34 has a rear end portion 34a fixedly mounted to the lower dashboard section 21.

More specifically, the rear sub-frame section 34 includes: a tension wall portion 67; upper wall portion 68; lower wall portion 69; front flange 71; upper flange 68a; and lower flange 69a. The tension wall portion 67, upper wall portion 68 and rear lower wall portion 69 together constitute a member of a generally "U" (or channel) sectional shape.

The tension wall portion 67 of the rear sub-frame section 34 constitutes a rear portion of the outer wall 37 of the vehicle body frame 12 and extends in parallel to the centerline 49 of the vehicle body. The front flange 71 is formed at the front end of the tension wall portion 67 and has a plurality of outer mounting holes formed therein.

The upper wall portion 68 of the rear sub-frame section 34 constitutes a rear portion of the upper wall 38 of the vehicle body frame 12. The upper flange 68a is formed at the inner upper edge of the upper wall portion 68 and has a plurality of upper mounting holes formed therein.

The lower wall portion 69 of the rear sub-frame section 34 constitutes a rear portion of the lower wall 39 of the vehicle body frame 12. The lower flange 69a is formed at the inner lower edge of the lower wall portion 69 and has a plurality of lower mounting holes formed therein.

The thickness T1 of the main frame section 31 and the thickness T2 of the front sub-frame section 32, middle sub-frame section 33 and rear sub-frame section 34 have a relationship of T1>T2. Specifically, the light alloy material is smaller in specific gravity than the steel material. More specifically, the specific gravity of the aluminum alloy used as the light alloy material is about one-third of that of the steel material. Thus, for a same weight, the thickness T1 of the main frame section (in the form of an aluminum alloy plate) 31 can be increased up to about three times the thickness T2 of each of the steel-made sub-frame sections (steel plates) 32-34.

Because the main frame section 31 is made of light alloy, such as aluminum alloy, and has the increased thickness T1, the front compressed wall portion 42, middle compressed wall portion 44 and rear compressed wall portion 46 can have an increased resistive strength against a buckling stress (i.e., buckling strength).

For example, if a thickness ratio of the aluminum alloy plate to the steel plate is 1.5, then the buckling strength ratio between the aluminum alloy plate and the steel plate is 1.1:1. If the thickness ratio of the aluminum alloy plate to the steel plate is 2, then the buckling strength ratio between the aluminum alloy plate and the steel plate is 2.6:1. If the thickness ratio of the aluminum alloy plate to the steel plate is 2.5, then the buckling strength ratio between the aluminum alloy plate and the steel plate is 5.2:1. Further, if the thickness ratio of the aluminum alloy plate to the steel plate is 3, then the buckling strength ratio between the aluminum alloy plate and the steel plate is 9:1.

The steel material, on the other hand, has a higher resistive strength against a tensile stress and greater elongation amount than the aluminum material. Thus, the front-sub-frame section 32, middle sub-frame section 33 and rear sub-frame section 34 are made of the steel material, so that the front, middle and rear tension wall portions 54, 61 and 67 can have increased energy absorption amounts.

The upper flange 55a of the front sub-frame section 32 is fixed to upper edge portions of the front compressed wall portion 42 and front cross portion 43 of the main frame section 31 by means of bolts 73 and nuts 74.

The lower flange 56a of the front sub-frame section 32 is fixed to lower edge portions of the front compressed wall portion 42 and front cross portion 43 of the main frame section 31 by means of bolts 73 and nuts 74.

The rear flange 57 of the front sub-frame section 32 is fixed to a front edge portion 44d of the middle compressed wall portion 44 of the main frame section 31 by means of bolts 73 and nuts 74. The rear flange 57 has its upper end portion fastened together with the upper flange 62a of the middle sub-frame section 33 and its lower end portion fastened together with the lower flange 63a of the middle sub-frame section 33.

The upper flange 62a of the middle sub-frame section 33 is fixed to upper edge portions of the front cross portion 43, middle compressed portion 44 and rear cross portion 45 of the main frame section 31 by means of bolts 73 and nuts 74.

The lower flange 63a of the middle sub-frame section 33 is fixed to lower edge portions of the front cross portion 43, middle compressed portion 44 and rear cross portion 45 of the main frame section 31 by means of bolts 73 and nuts 74.

The front flange 64 of the middle sub-frame section 33 is fixed to a rear edge portion of the front compressed wall portion 42 of the main frame section 31 by means of bolts 73 and nuts 74. The front flange 64 has its upper end portion fastened together with the upper flange 55a of the front sub-frame section 32 and its lower end portion fastened together with the lower flange 56a.

The rear flange 65 of the middle sub-frame section 33 is fixed to a front edge portion 46b of the rear compressed wall portion 46 of the main frame section 31 by means of bolts 73 and nuts 74. The rear flange 65 has its upper end portion fastened together with the upper flange 68a of the rear sub-frame section 34 and its lower end portion fastened together with the lower flange 69a.

The upper flange 68a of the rear sub-frame section 34 is fixed to upper edge portions of the rear cross portion 45 and rear compressed wall portion 46 of the main frame section 31 by means of bolts 73 and nuts 74. The lower flange 69a of the rear sub-frame section 34 is fixed to lower edge portions of the rear cross portion 45 and rear compressed wall portion 46 of the main frame section 31 by means of bolts 73 and nuts 74.

The front flange 71 of the rear sub-frame section 34 is fixed to a lower edge portion 44e of the middle compressed wall portion 44 of the main frame section 31 by means of bolts 73 and nuts 74. The front flange 71 has its upper end fastened together with the upper flange 62a of the middle sub0frame section 33 and its lower end portion fastened together with the lower flange 63a.

As set forth above, the front sub-frame section 32 can be readily fixed to the main frame section 31 by its upper flange 55a, lower flange 56a and rear flange 57 being bolted to the main frame 31. Further, the middle sub-frame section 33 can be readily fixed to the main frame section 31 by its upper flange 62a, lower flange 63a, front flange 64 and rear flange 65 being bolted to the main frame 31. Further, the rear sub-frame section 34 can be readily fixed to the main frame section 31 by its upper flange 68a, lower flange 69a and front flange 71 being bolted to the main frame 31.

In the aforementioned manner, the front sub-frame section 32, middle sub-frame section 33 and rear sub-frame section 34 can be readily fixed to the main frame section 31.

As shown in FIG. 3, the front compressed wall portion 42 of the main frame section 31 has the rear half portion 42b slanted at the angle θ1 toward the centerline of the vehicle body, the middle tension wall portion 54 has the front half portion 61a slanted at the angle θ1 toward the centerline of the vehicle body, the tension wall portion 54 of the front sib-frame section 32 has the rear half portion 54b slanted at the angle θ1 toward the centerline of the vehicle body, and the middle compressed wall portion 44 has the front half portion 44a slanted at the angle θ1 toward the centerline of the vehicle body.

Thus, front, middle and rear sections 30a, 30b and 30c (FIG. 3) of are bent in a substantial crank shape. With the vehicle body frame 12 thus bent in a substantial crank shape, the front section 30a is located displaced, outwardly in a width direction of the vehicle body, from the rear section 30c by a distance L1. The front section 30a of the vehicle body frame 12 can have a greatly increased dimension L3 in the width direction (i.e., widthwise dimension L3) with the rear section 30c having a smaller widthwise dimension L2.

Thus, it is possible to secure a sufficient engine-accommodating space 76 for accommodating therein the engine/transmission unit 19 and radiator 29.

Figure 5A:
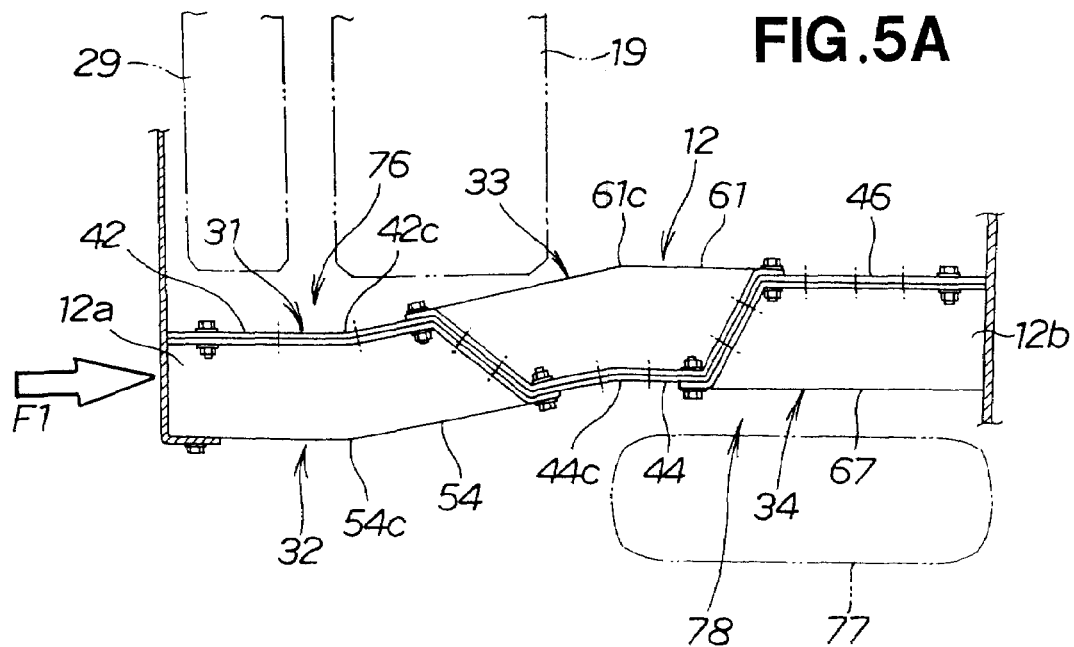
FIGS. 5A and 5B are diagrams explanatory of behavior of the vehicle body frame according to the first embodiment when an impact has acted on the vehicle body frame.
Figure 5B:
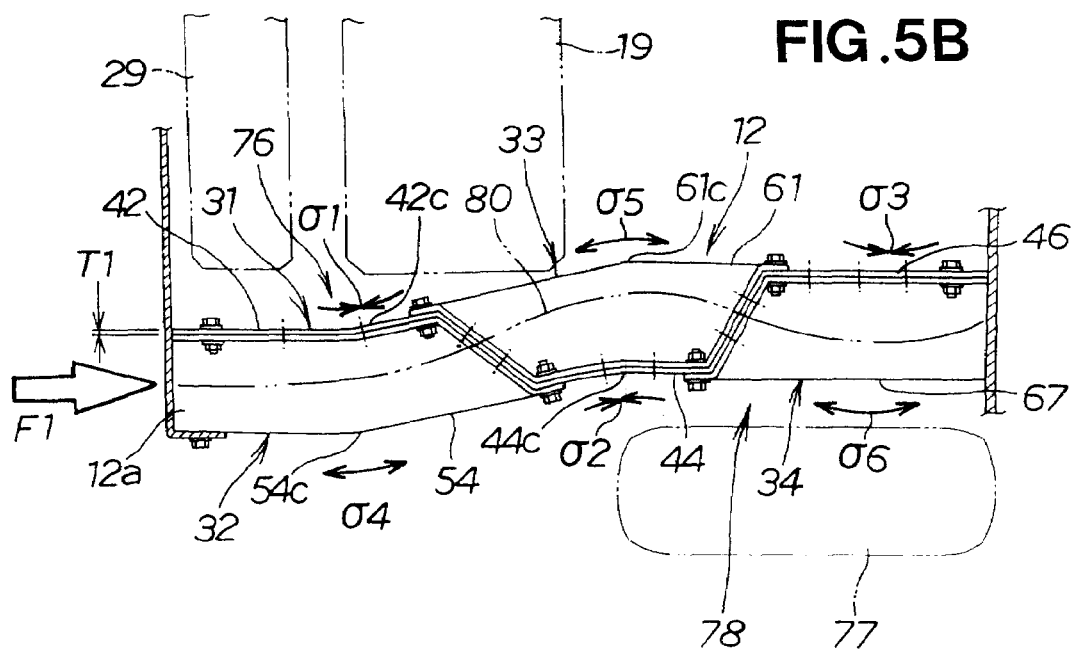

With reference to FIGS. 5A, 5B and 6, the following paragraphs describe behavior of the vehicle body frame 12 when an impact has acted on the vehicle body frame 12. FIGS. 5A and 5B show behavior when an impact has acted on the first embodiment of the vehicle body frame.

FIG. 5A shows an impact F1 having acted on the front end portion 12a of the vehicle body frame 12 as indicated by a white arrow. FIG. 5B shows that, due to the applied impact F1, the vehicle body frame 12 is subjected to a deforming force as indicated by an imaginary line 80. Thus, a first compressive stress σ1 acts on the bent portion 42c of the front compression wall portion 42, a second compressive stress σ2 acts on the bent portion 44c of the middle compressed wall portion 44, and a third compressive stress σ3 acts on a substantial middle region of the rear compression wall portion 46.

Because the front compressed wall portion 42, middle compressed wall portion 44 and rear compressed wall portion 46 of the main frame section 31 are each made of light alloy, such as aluminum alloy, and thus have an increased thickness T1, these compressed wall portions 42, 44 and 46 can have an increased resistive strength against a buckling stress. Thus, the first to third compressive stress σ1, σ2 and σ3 can be appropriately resisted or borne by the respective compressed wall portions 42, 44 and 46.

Simultaneously, a first tensile stress σ4 acts on the bent portion 54c of the tension wall portion 54 of the front sub-frame section 32, a second tensile stress σ5 acts on the bent portion 61c of the tension wall portion 61 of the middle sub-frame section 33, and a third tensile stress σ6 acts on a substantial middle portion of the tension wall portion 67 of the rear sub-frame section 34.

Because the tension wall portion 54 of the front sub-frame section 32, tension wall portion 61 of the middle sub-frame section 33 and tension wall portion 67 of the rear sub-frame section 34 (i.e., front tension wall portion 54, middle tension wall portion 61 and rear tension wall portion 67 of the vehicle body frame 12) are made of a steel material and thus have an increased resistive strength against a tensile stress and increased maximum elongation amount, energy of the first to third tensile stresses σ4, σ5 and σ6 can be appropriately absorbed by the respective tension wall portions 54, 61 and 67.

Thus, with the simple construction of attaching the sub-frame sections 32-34 made of steel to the main frame section 31 made of light metal, it is possible to readily achieve a sufficient energy absorption amount of the vehicle body frame 12 having the bent portions 42c, 44c, 54c and 61c.

In addition, because sufficient rigidity of the vehicle body frame 12, having the bent portions 42c, 44c, 54c and 61c, can be readily secured, it is possible to secure not only the engine-accommodating space 76 for accommodating the engine-/transmission unit 19 and radiator 29 but also a space 78 for accommodating the front road wheel 77. As a consequence, it is possible to enhance a degree of layout freedom of the engine-/transmission unit 19, radiator 29 and front road wheel 77.

FIG. 6 is a graph explanatory of an impact that can be borne by the first embodiment of the vehicle body frame 12. More, specifically, curve G1 shows, as comparative example 1, a vehicle body frame made of a steel material alone. Curve 2 shows, as comparative example 2, a vehicle body frame made of a light alloy material (e.g., aluminum alloy material) alone, and curve 3 shows, as first inventive example, the first embodiment of the vehicle body frame 12 described above in relation to FIGS. 1-5.

With comparative example 1 where the vehicle body frame is made of a steel material alone, it is difficult to achieve an increased resistive strength against a compressive stress. Thus, a maximum bearable impact level F2 of this vehicle body frame (i.e., maximum impact that can be borne by the vehicle body frame) is very low.

With comparative example 2 where the vehicle body frame made of a light alloy material (e.g., aluminum alloy material) alone, it is difficult to achieve an increased resistive strength against a tensile stress. Thus, a maximum bearable impact level F3 of this vehicle body frame is extremely low.

With the first inventive example, where each portion on which a compressive stress acts is made of a light alloy material (aluminum alloy material) and each portion on which a tensile stress acts is made of a steel material, it is possible to significantly increase a maximum bearable impact level F1 of the vehicle body frame (i.e., maximum impact that can be borne by the vehicle body frame), as compared to comparative examples 1 and 2. As a result, the first inventive example (vehicle body frame 12) can significantly increase an impact energy amount that can be absorbed in an initial region E1 where the impact has occurred.

Now, with reference to FIGS. 7-11, a description will be given about second and third embodiments of the vehicle body frame of the present invention, where the same elements as in the first embodiment are indicated by the same reference characters as in FIGS. 1-5 and will not be described here to avoid unnecessary duplication.

Second Embodiment

Figure 7:
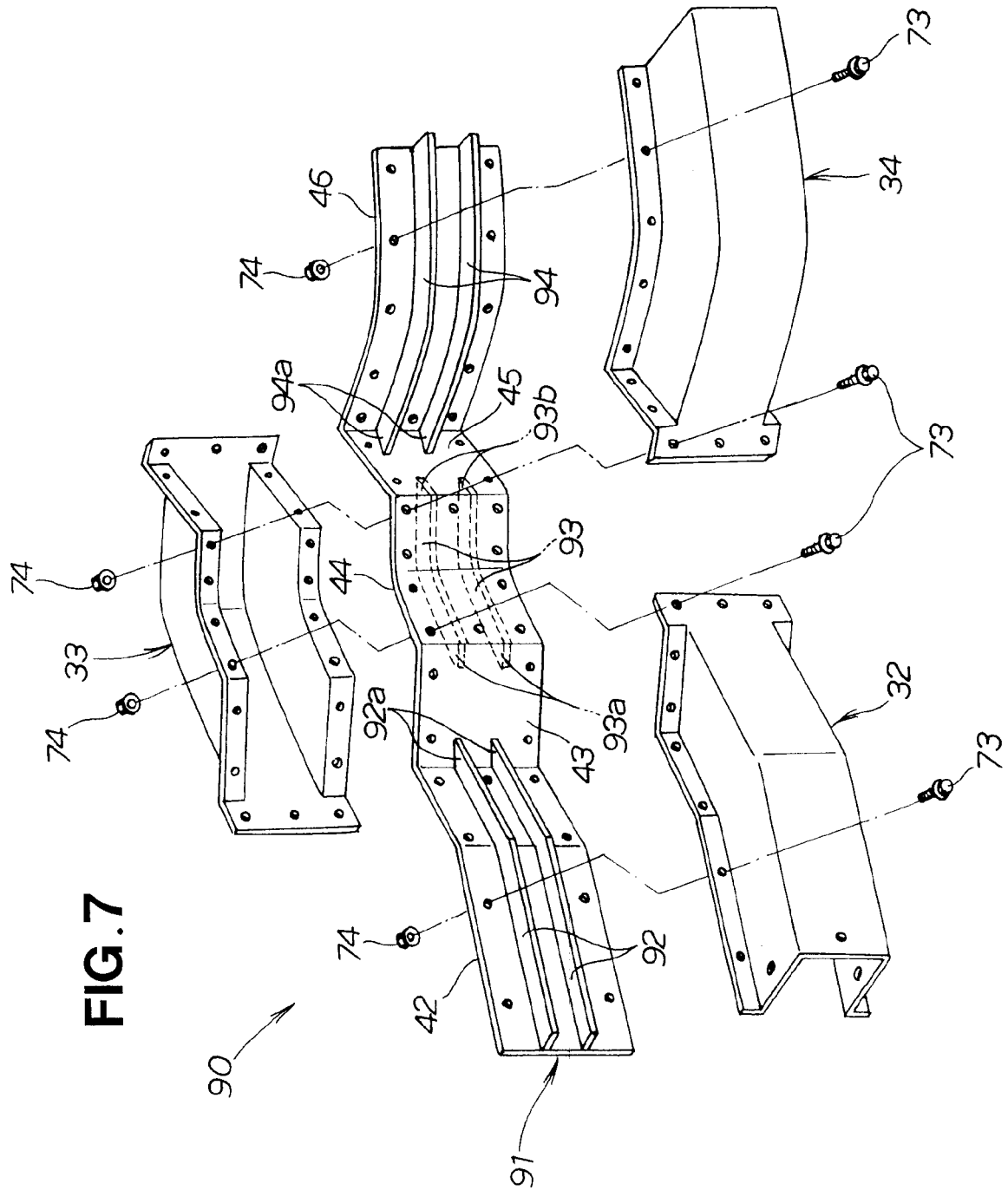
FIG. 7 is an exploded perspective view showing a vehicle body frame according to a second embodiment of the present invention.

FIG. 7 is an exploded perspective view showing the second embodiment of the vehicle body frame 90 of the present invention, which is similar to the first embodiment except that it includes a modified main frame section 91 in place of the main frame section 31 employed in the first embodiment of the vehicle body frame 12.

The main frame section 91 is similar to the main frame section 31 but different therefrom in that it has a pair of first upper and lower horizontal reinforcing ribs 92 formed on the outer surface of the front compression wall portion 42, a pair of second upper and lower horizontal reinforcing ribs 93 formed on the inner surface of the middle compression wall portion 44 and a pair of third upper and lower horizontal reinforcing ribs 94 formed on the outer surface of the rear compression wall portion 46. Similarly to the main frame section 31 in the first embodiment, the main frame section 91 may be formed by casting.

The first upper and lower horizontal reinforcing ribs 92, formed on the outer surface of the front compression wall portion 42, each extend in the front-rear direction of the vehicle body and connect at a rear end 92a to the front cross portion 43. The first upper and lower horizontal reinforcing ribs 92 are covered with the front sub-frame section 43.

The second upper and lower horizontal reinforcing ribs 93, formed on the inner surface of the middle compression wall portion 44, each extend in the front-rear direction of the vehicle body and connect at a front end 93a to the front cross portion 43 and at a rear end 93b to the rear cross portion 45. The second upper and lower horizontal reinforcing ribs 93 are covered with the middle sub-frame section 33.

The third upper and lower horizontal reinforcing ribs 94, formed on the outer surface of the rear compression wall portion 46, each extend in the front-rear direction of the vehicle body and connect at a front end 94a to the rear cross portion 45. The third upper and lower horizontal reinforcing ribs 94 are covered with the rear sub-frame section 34.

With the first upper and lower horizontal reinforcing ribs 92 formed on the front compression wall portion 42, second upper and lower horizontal reinforcing ribs 93 on the middle compression wall portion 44 and third upper and lower horizontal reinforcing ribs 94 formed on the rear compression wall portion 46, the second embodiment can even further increase the resistive strength, against a compressive stress, of each of the compression wall portions 42, 44 and 46.

Figure 8:
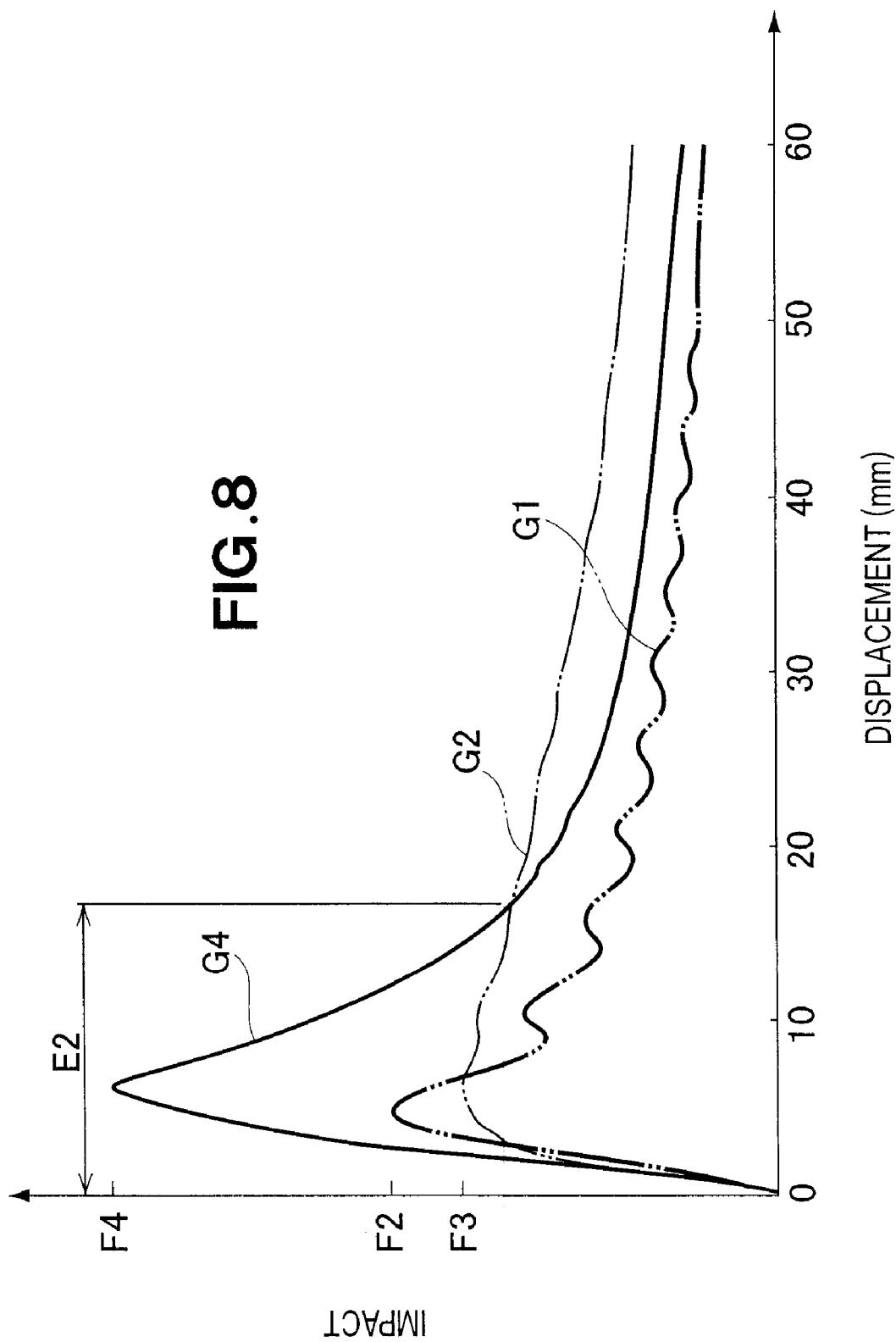
FIG. 8 is a graph explanatory of an impact that can be borne by the vehicle body frame according to the second embodiment.

FIG. 8 is a graph explanatory of an impact that can be borne by the second embodiment of the vehicle body frame. More, specifically, curves G1 and G2 show comparative example 1 and comparative example 2, similarly to FIG. 6. Curve G4 shows, as second inventive example, the second embodiment of the vehicle body frame 90.

The second inventive example, where the first to third upper and lower horizontal reinforcing ribs 92-94 are provided on the compression wall portions 42, 44 and 46 on which a compressive stress acts, can significantly increase the resistive strength against a compressive stress as compared to the first inventive example.

Thus, a maximum bearable impact level F4 of the vehicle body frame 90 according to the second inventive example (i.e., maximum impact that can be borne by the second inventive example) can be increased as compared to the maximum bearable impact level F1 of the first inventive example shown in FIG. 6. As a result, the vehicle body frame 90 according to the second inventive example can even further increase the impact energy absorption amount in an initial region E2 where the impact has occurred.

Namely, the second embodiment of the vehicle body frame 90 can significantly increase the maximum bearable impact level as compared to the first embodiment, and the second embodiment of the vehicle body frame 90 can achieve the same advantageous benefits as the first embodiment of the vehicle body frame 12.

Third Embodiment

Figure 9:
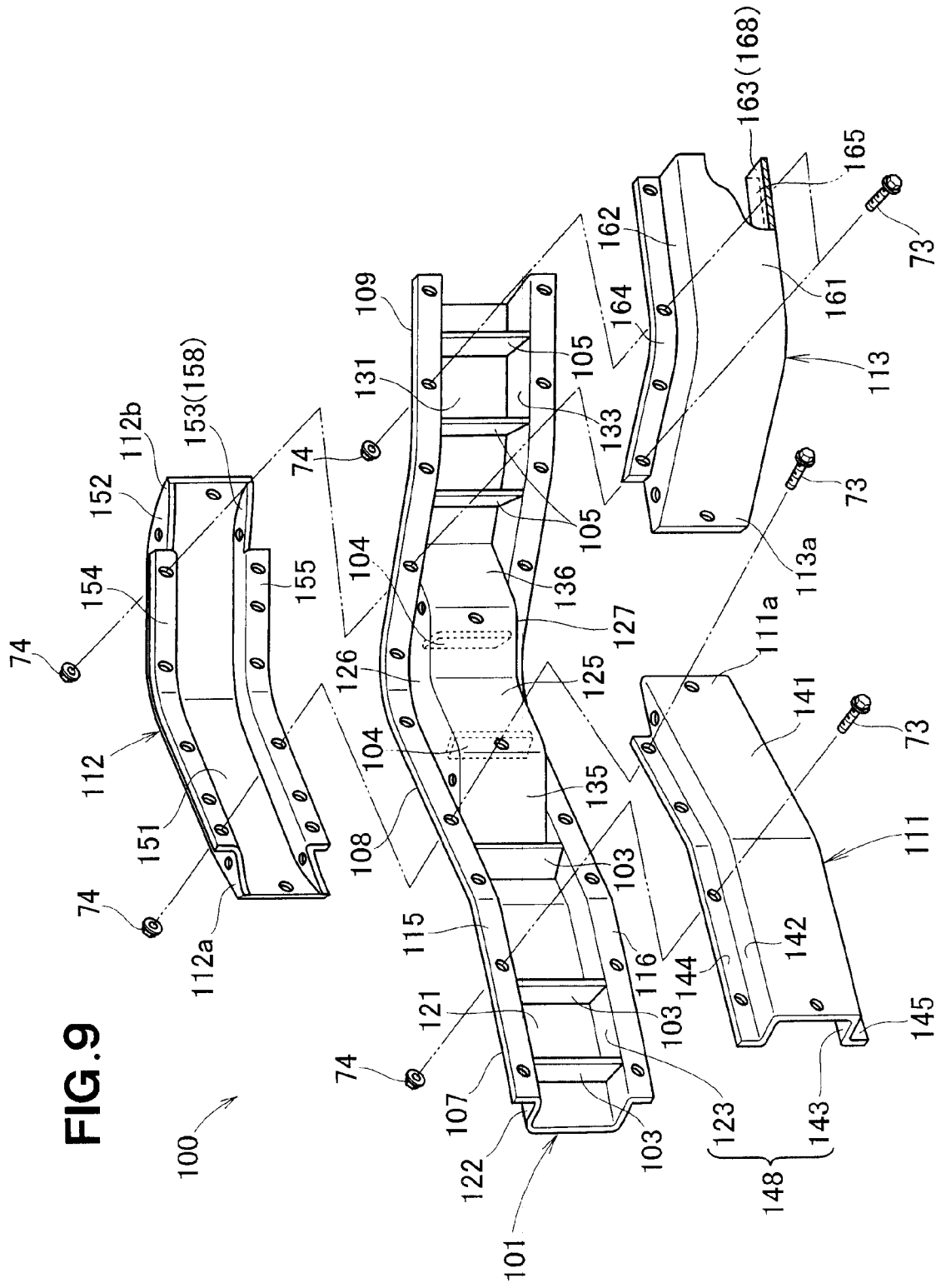
FIG. 9 is an exploded perspective view showing a vehicle body frame according to a third embodiment of the present invention.
Figure 10:
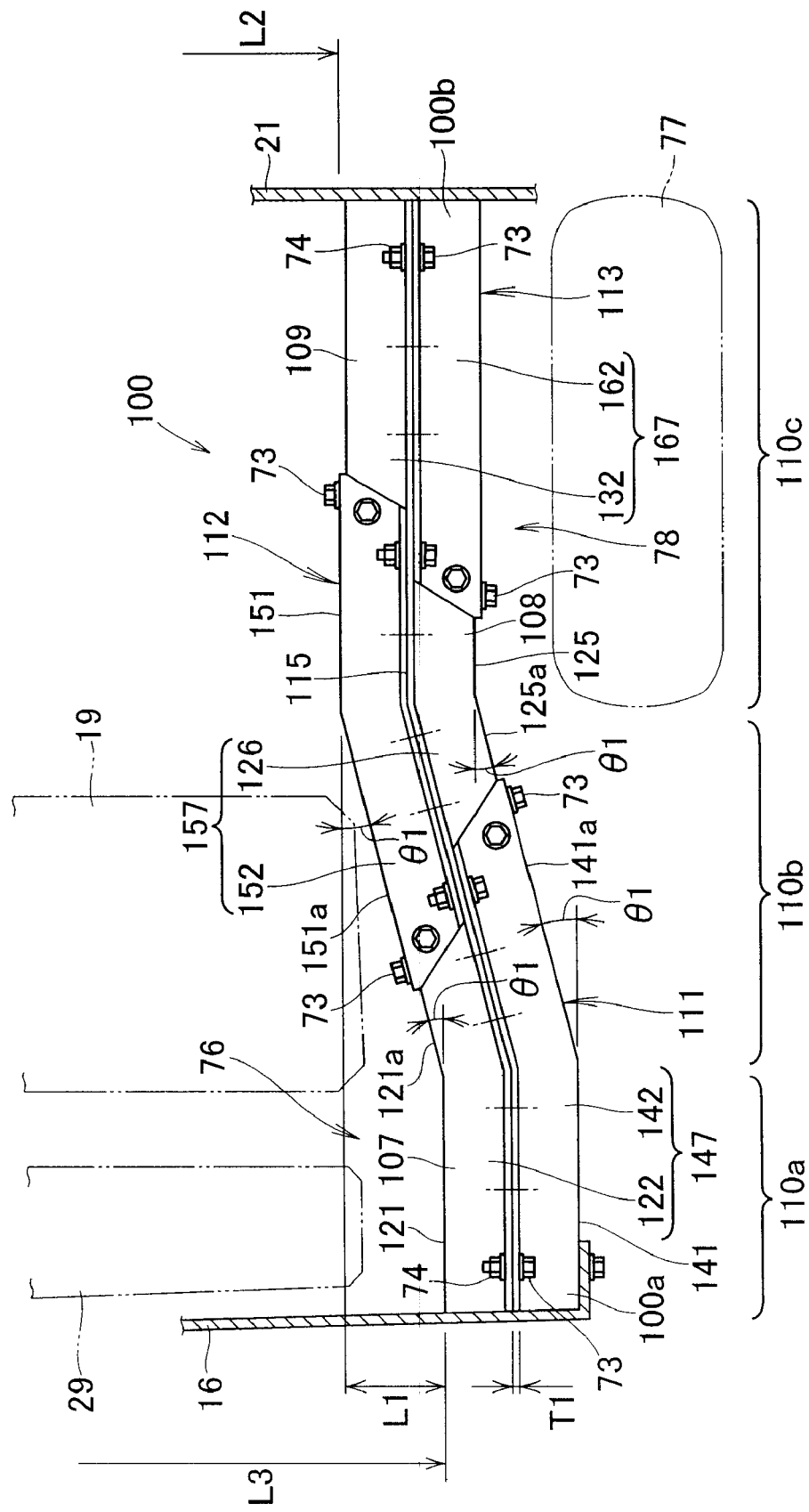
FIG. 10 is a plan view showing the vehicle body frame according to the third embodiment.

FIG. 9 is an exploded perspective view showing the third embodiment of the vehicle body frame of the invention, and FIG. 10 is a plan view of the third embodiment.

The third embodiment of the vehicle body frame 100 includes a modified main frame section 101 made of light metal and formed into a generally "U" (or channel) sectional shape so that the main frame section 101 has upper and lower flanges 115 and 116 provided centrally in the width direction of the vehicle body frame 100. The main frame section 101 also has vertical reinforcing ribs 103, 104 and 105 provided in a space defined by the "U" (or channel) sectional shape.

The vehicle body frame 100 includes: a main frame section 101 made of light metal; a front sub-frame section 111 made of steel and fixedly mounted to a front portion 107 of the main frame section 101; a middle sub-frame section 112 made of steel and fixedly mounted to a middle portion 108 of the main frame section 101; and a rear sub-frame section 113 made of steel and fixedly mounted to a rear portion 109 of the main frame section 101.

As shown in FIG. 10, the main frame section 101 extends from a front end portion 100a up to a rear end portion 100b of the vehicle body frame 100. The front portion 107 of the main frame section 101 bulges inwardly toward the centerline 49 of the vehicle body, the middle portion 108 bulges outwardly away from the centerline 49, and the rear portion 109 bulges inwardly toward the centerline 49. The upper and lower flanges 115 and 116 are formed at the upper and lower edges of the main frame section 101 (the lower flange 116 is shown in FIG. 9).

By bulging inwardly toward the centerline 49 of the vehicle body as noted above, the front portion 107 of the main frame section 101 is formed into a generally "U" (or channel) sectional shape, which is defined by a compression wall portion 121, upper wall portion 122 and lower wall portion 123. A plurality of the first vertical reinforcing ribs 103 are formed integrally with the upper wall portion 122 and lower wall portion 123 and spaced from each other at predetermined intervals.

By bulging outwardly away from the centerline 49 of the vehicle body as noted above, the middle portion 108 of the main frame section 101 is formed into a generally "U" (or channel) sectional shape, which is defined by a compression wall portion 125, upper wall portion 126 and lower wall portion 127. A plurality of the second vertical reinforcing ribs 104 are formed integrally with the upper wall portion 126 and lower wall portion 127 of the main frame section 101 and spaced from each other at predetermined intervals.

Further, by bulging inwardly toward the centerline 49 of the vehicle body as noted above, the rear portion 109 of the main frame section 101 is formed into a generally "U" (or channel) sectional shape, which is defined by a compression wall portion 131, upper wall portion 132 (see FIG. 10) and lower wall portion 133. A plurality of the third vertical reinforcing ribs 105 are formed integrally with the upper wall portion 132 and lower wall portion 133 of the main frame section 101 and spaced from each other at predetermined intervals.

The rear end of the compression wall portion 121 of the front main frame portion 107 is connected with the front end of the compression wall portion 125 of the middle main frame portion 108 via a front cross portion 135. The rear end of the compression wall portion 125 of the middle main frame portion 108 is connected with the front end of the compression wall portion 131 of the rear main frame portion 109 via a front cross portion 136.

Namely, as seen in FIG. 9, the main frame section 101 sequentially includes, in the front-to-rear direction of the vehicle body frame 100, the compressed wall portion 135, front cross portion 135, compressed wall portion 125, rear cross portion 136 and compressed wall portion 131. For example, the main frame section 101 is formed by casting so as to have a thickness T1.

The front sub-frame section 111 is a member of a generally "U" (or channel) sectional shape, which is fixedly mounted along the front portion 107 of the main frame section 101 to form a hollow structure in conjunction with the front portion 107. The front sub-frame section 111 has a thickness T2.

More specifically, the front sub-frame section 111 includes: a tension wall portion 141; upper wall portion 142; lower wall portion 143; upper flange 144; and lower flange 145. The upper flange 144 of the front sub-frame section 111 is fixed to a front portion of the upper flange 115 of the main frame section 101 by means of bolts 73 and nuts 74, and the lower flange 145 of the front sub-frame section 111 is fixed to a front portion of the lower flange 116 of the main frame section 101 by means of bolts 73 and nuts 74.

The front sub-frame section 111 is bolted to the main frame section 101 with its rear end portion 111a covering front end portions of the middle compression wall portion 125, middle upper wall portion 126 and middle lower wall portion 127 of the main frame section 101.

Front upper wall portion 147 of the vehicle body frame 100 is formed by the upper wall portion 142 of the front sub-frame section 111 and upper wall portion 122 of the main frame section 101. Front lower wall portion 148 of the vehicle body frame 100 is formed by the lower wall portion 143 of the front sub-frame section 111 and lower wall portion 123 of the main frame section 101. Thus, the front section of the vehicle body frame 100 is formed into a hollow structure of a generally rectangular sectional shape with four or more wall portions that include the tension wall portion 141 of the front sub-frame section 111, compression wall portion 121 of the front portion 107, front upper wall portion 147 and front lower wall portion 148.

The middle sub-frame section 112 is a member of a generally "U" (or channel) sectional shape, which is fixedly mounted along the middle portion 108 of the main frame section 101 to form a hollow structure in conjunction with the middle portion 108. The middle sub-frame section 112 has the thickness T2.

More specifically, the middle sub-frame section 112 includes: a tension wall portion 151; upper wall portion 152; lower wall portion 153; upper flange 154; and lower flange 155. The upper flange 154 of the middle sub-frame section 112 is fixed to a middle portion of the upper flange 115 of the main frame section 101 by means of bolts 73 and nuts 74, and the lower flange 155 is fixed to a middle portion of the lower flange 116 of the main frame section 101 by means of bolts 73 and nuts 74.

Front end portion 112a of the middle sub-frame section 112 is bolted to the main frame section 101 with the front end portion 112a covering rear end portions of the front compression wall portion 121, front upper wall portion 122 and front lower wall portion 123 of the main frame section 101.

Rear end portion 112b of the middle sub-frame section 112 is bolted to the main frame section 101 with the rear end portion 112b covering front end portions of the rear compression wall portion 131, rear upper wall portion 132 and rear lower wall portion 133 of the main frame section 101.

Front upper wall portion 157 of the vehicle body frame 100 is formed by the upper wall portion 152 of the middle sub-frame section 112 and middle upper wall portion 126 of the main frame section 101. Front lower wall portion 158 of the vehicle body frame 100 is formed by the lower wall portion 153 of the middle sub-frame section 112 and middle lower wall portion 127 of the main frame section 101. Thus, the middle section of the vehicle body frame 100 is formed into a hollow structure of a generally rectangular sectional shape with four or more wall portions that include the tension wall portion 151 of the middle sub-frame section 112, compression wall portion 125 of the middle portion 108, middle upper wall portion 157 and middle lower wall portion 158.

The rear sub-frame section 113 is a member of a generally "U" (or channel) sectional shape, which is fixedly mounted along the rear portion 109 of the main frame section 101 to form a hollow structure in conjunction with the front portion 109. The rear sub-frame section 113 has the thickness T2.

More specifically, the rear sub-frame section 113 includes: a tension wall portion 161; upper wall portion 162; lower wall portion 163; upper flange 164; and lower flange 165. The upper flange 164 of the rear sub-frame section 113 is fixed to a rear portion of the upper flange 115 of the main frame section 101 by means of bolts 73 and nuts 74, and the lower flange 165 is fixed to a rear portion of the lower flange 116 of the main frame section 101 by means of bolts 73 and nuts 74.

Front end portion 113a of the rear sub-frame section 113 is bolted to the main frame section 101 with the front end portion 113a covering rear end portions of the middle compression wall portion 125, middle upper wall portion 126 and middle lower wall portion 127 of the main frame section 101.

Rear upper wall portion 167 of the vehicle body frame 100 is formed by the upper wall portion 162 of the rear sub-frame section 113 and rear upper wall portion 132 of the main frame section 101. Rear lower wall portion 168 of the vehicle body frame 100 is formed by the lower wall portion 163 of the rear sub-frame section 113 and rear lower wall portion 133 of the main frame section 101. Thus, the rear section of the vehicle body frame 100 is formed into a hollow structure of a generally rectangular sectional shape with four or more wall portions that include the tension wall portion 161 of the rear sub-frame section 112, compression wall portion 131 of the rear portion 109, rear upper wall portion 167 and rear lower wall portion 168. Namely, the vehicle body frame 100 is a hollow structure of a generally rectangular sectional shape formed with four or more wall portions.

In the vehicle body frame 100, the first vertical reinforcing ribs 103 are formed integrally with the front upper wall portion 122 and front lower wall portion 123 of the main frame section 101 and spaced from each other at predetermined intervals. Thus, it is possible to prevent the front upper wall portion 122 and front lower wall portion 123 from bucklingly deforming when buckling deformation of the front compression wall portion 121 has occurred.

Further, the second vertical reinforcing ribs 104 are formed integrally with the middle upper wall portion 126 and middle lower wall portion 127 of the main frame section 101 and spaced from each other at predetermined intervals. Thus, it is possible to prevent the middle upper wall portion 126 and middle lower wall portion 127 from bucklingly deforming when buckling deformation of the middle compression wall portion 125 has occurred.

Furthermore, the third vertical reinforcing ribs 105 are formed integrally with the rear upper wall portion 132 and rear lower wall portion 133 of the main frame section 101 and spaced from each other at pre-determined intervals. Thus, it is possible to prevent the rear upper wall portion 132 and rear lower wall portion 133 from bucklingly deforming when buckling deformation of the rear compression wall portion 131 has occurred.

In the third embodiment of the vehicle body frame 100, the main frame section 101 is formed into a generally "U" (or channel) sectional shape so that the upper and lower flanges 115 and 116 are provided centrally in the width direction of the vehicle body frame 100.

Further, in the vehicle body frame 100, as seen in FIG. 10, the front compressed wall portion 121 of the main frame section 101 has a rear half portion 121a slanted at an angle θ1 toward the centerline of the vehicle body, and the tension wall portion 151 of the middle sub-frame section 112 has a front half portion 151a slanted at the angle θ1 toward the centerline of the vehicle body, as in the first embodiment of the vehicle body frame 12.

Further, the tension wall portion 141 of the front sub-frame section 111 has a rear half portion 141a slanted at the angle θ1 toward the centerline of the vehicle body, and the compression wall portion 125 of the main frame section 101 has a front half portion 125a slanted at the angle θ1 toward the centerline of the vehicle body, as in the first embodiment of the vehicle body frame 12.

Thus, front, middle and rear sections 110a, 110b and 110c of the vehicle body frame 100 are bent in a substantial crank shape. With the vehicle body frame 100 thus bent in a substantial crank shape, the front section 110a is located displaced, outwardly in the width direction of the vehicle body, from the rear section 110c by a distance L1.

The front section 110a of the vehicle body frame 100 can have a greatly increased dimension L3 in the width direction (widthwise dimension L3) with the rear section 110c reduced to a small widthwise dimension L2.

Thus, it is possible to secure the engine-accommodating space 76 for accommodating the engine/transmission unit 19 and radiator 29.

Figure 11:
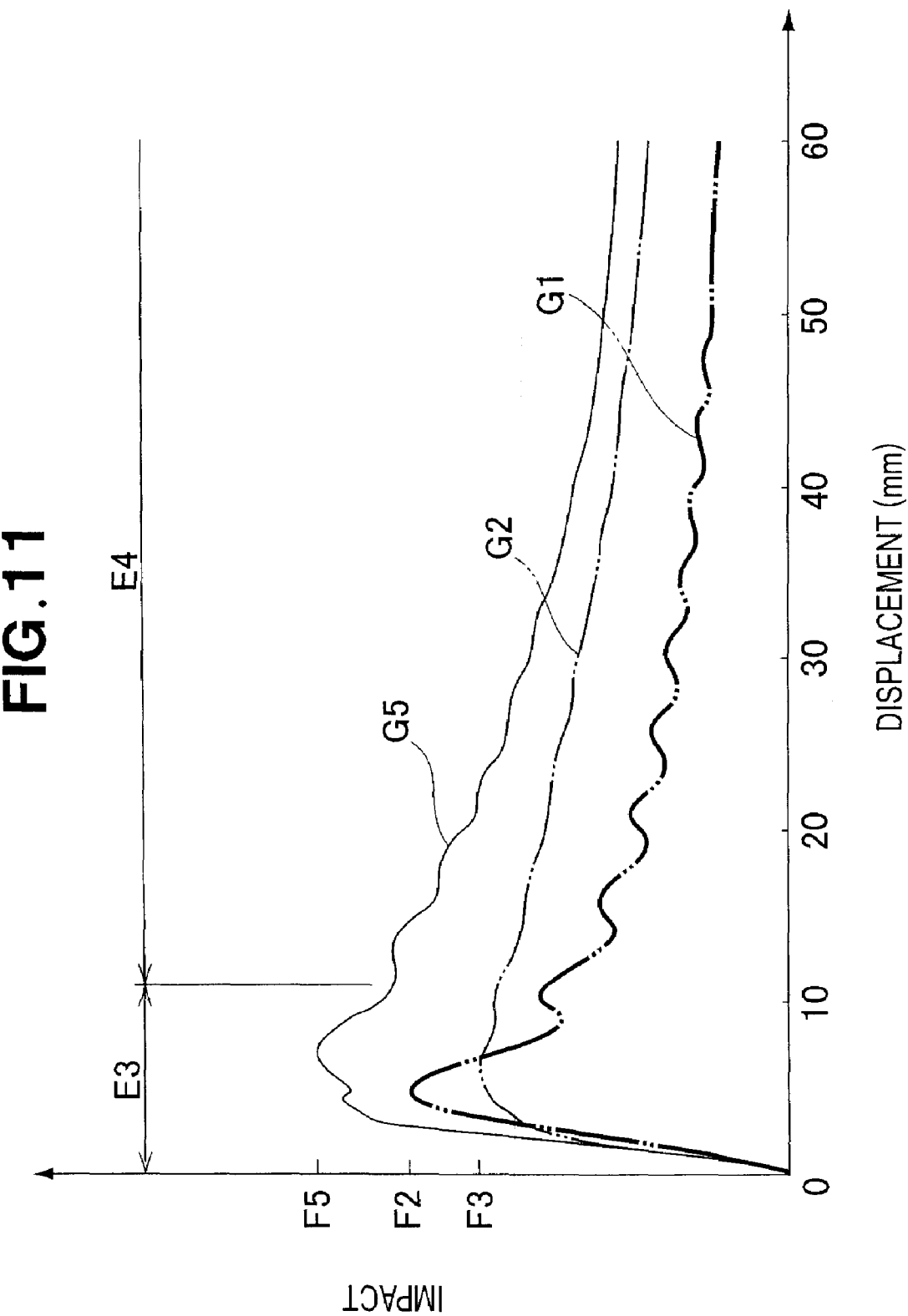
FIG. 11 is a graph explanatory of an impact that can be borne by the vehicle body frame according to the third embodiment.

FIG. 11 is a graph explanatory of an impact that can be borne by the third embodiment of the vehicle body frame. More, specifically, curves G1 and G2 in FIG. 11 show comparative example 1 and comparative example 2, similarly to FIG. 6. Curve G5 shows, as a third inventive example, the third embodiment of the vehicle body frame 100 shown in FIGS. 9 and 10.

The third inventive example, where, in addition to the elements provided in the first inventive example, the first to third vertical reinforcing ribs 103-105 are provided on the compression wall portions 121, 125 and 131 on which a compressive stress acts, can prevent the upper wall portions 122, 126 and 132 and 132 and lower wall portions 123, 127 and 133 from bucklingly deforming when buckling deformation of the compression wall portions 121, 125 and 131 has occurred.

Thus, according to the third inventive example, the vehicle body frame 100 can attain a high maximum bearable impact level F5 similarly to the first inventive example shown in FIG. 6. In addition, the third inventive example can absorb a great impact energy amount in an initial region E3 where the impact has occurred, similarly to the first inventive example. Further, the third inventive example can absorb a great impact energy amount in a region E4 following the initial region E3, similarly to the first inventive example.

Namely, according to the third embodiment, the vehicle body frame 100 can increase the maximum bearable impact level as high as the first embodiment, and it can keep bearing a great impact even after bearing the maximum bearable impact level F5.

Furthermore, the third embodiment of the vehicle body frame 100 can achieve the same advantageous benefits as the first embodiment of the vehicle body frame 12.

Whereas the first to third embodiments of the present invention have been described above in relation to the case where the front sub-frame sections 32, 111, middle sub-frame sections 33, 112 and rear sub-frame sections 34, 113 are bolted to the corresponding main frame sections 31, 91 and 101, the present invention is not so limited. Namely, the sub-frame sections 32, 33, 34, 111, 112 and 113 may be joined to the corresponding main frame sections 31, 91 and 101 by riveting, spot welding or otherwise.

Further, whereas the first to third embodiments of the present invention have been described above as using aluminum alloy as the light 6 alloy, any other suitable light alloy, such as titanium alloy, may be used.

Furthermore, whereas the first to third embodiments of the present invention have been described above in relation to the case where the front sub-frame sections 32, 111, middle sub-frame sections 33, 112 and rear sub-frame sections 34, 113 are each formed into a generally "U" (or channel) sectional shape, the present invention is not so limited. For example, these sub-frame sections may be formed into any other suitable sectional shapes, such as a generally-arcuate sectional shape.

Furthermore, whereas the first to third embodiments of the present invention have been described above in relation to the case where the inventive vehicle body frame 12, 90, 100 is applied to the front vehicle body structure 10, the present invention is not so limited. For example, the inventive vehicle body frame 12, 90, 100 may be applied to any other vehicle structures.

The present invention is suited for application to automotive vehicles provided with a vehicle body frame including a compression wall portion and tension wall portion where are produced a compressive stress and tensile stress, respectively, when an impact has acted on the vehicle body frame.

Obviously, various minor changes and modifications of the present invention are possible in light of the above teaching. It is therefore to be understood that within the scope of the appended claims the invention may be practiced otherwise than as specifically described.

What is claimed is:

1. A vehicle body frame formed as a hollow structure of a generally rectangular sectional shape and including a front compression wall portion where compressive stress is produced when an axial impact acts on the vehicle body frame, the vehicle body frame comprising:
   a main frame section made of light alloy and being in the form of a band extending along the vehicle body frame from a front end portion to a rear end portion of the vehicle body frame and having the front compression wall portion; and
   a sub-frame section made of steel and having a substantially U-shaped cross section, the sub-frame section being fixedly mounted to the main frame section and extending along a front part of the main frame section so as to form the hollow structure jointly with the front part of the main frame section and wall portions including inner and outer wall portions and upper and lower wall portions of the vehicle body frame,
   wherein the front compression wall portion is formed by a front part of the inner wall portion which is comprised of a front half lying parallel to a vehicle body centerline and a rear half bent a predetermined angle inwardly toward the vehicle body centerline at a front bent portion dividing the front and rear halves.

2. The vehicle body frame of claim 1, wherein the sub-frame portion includes a tension wall portion provided at a position where a tensile stress is produced when the axial impact acts on the vehicle body frame.

3. The vehicle body frame of claim 1, wherein the main frame section includes a front cross portion extending from the inner wall to the outer wall and having a plurality of upper mounting holes formed in an upper edge portion thereof and a plurality of lower mounting holes formed in a lower edge portion thereof.

4. The vehicle body frame of claim 1, wherein the main frame section includes a middle compressed wall portion that constitutes a middle portion of the outer wall of the vehicle body frame, is comprised of a front half portion bent to slant inwardly toward the centerline at a predetermined angle and a rear half portion bent at a middle bent portion to extend in parallel to the centerline and has a plurality of upper mounting holes formed in an upper edge portion thereof and a plurality of lower mounting holes formed in a lower edge portion thereof.

5. The vehicle body frame of claim 1, wherein the main frame section includes a rear cross portion extending from the outer wall to the inner wall and having a plurality of upper mounting holes formed in an upper edge portion thereof and a plurality of lower mounting holes formed in a lower edge portion thereof.

6. The vehicle body frame of claim 1, wherein the main frame section includes a rear compressed wall portion that constitutes a rear portion of the inner wall and extending in parallel to the centerline, the rear compressed wall portion having a rear end portion fixedly mounted to a lower dashboard section, a plurality of upper mounting holes formed in an upper edge portion thereof and a plurality of lower mounting holes formed in a lower edge portion thereof.

7. The vehicle body frame of claim 1, wherein the main frame section is made of aluminum alloy and has a thickness three times as large as a thickness of the sub-frame section made of steel.

* * * * *